US012191782B2

(12) United States Patent
Fu et al.

(10) Patent No.: US 12,191,782 B2
(45) Date of Patent: Jan. 7, 2025

(54) BIDIRECTIONAL POWER CONVERSION SYSTEM AND CONTROL METHOD

(71) Applicant: Huawei Digital Power Technologies Co., Ltd., Shenzhen (CN)

(72) Inventors: Dianbo Fu, Frisco, TX (US); Heping Dai, Plano, TX (US); Liming Ye, Plano, TX (US)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 397 days.

(21) Appl. No.: 17/643,471

(22) Filed: Dec. 9, 2021

(65) Prior Publication Data
US 2022/0109373 A1  Apr. 7, 2022

Related U.S. Application Data

(63) Continuation of application No. PCT/US2019/039190, filed on Jun. 26, 2019.

(51) Int. Cl.
*H02M 3/335* (2006.01)
*H02M 1/00* (2006.01)
(Continued)

(52) U.S. Cl.
CPC ......... *H02M 7/797* (2013.01); *H02M 1/0085* (2021.05); *H02M 1/4208* (2013.01);
(Continued)

(58) Field of Classification Search
CPC .............. H02M 7/797; H02M 3/335; H02M 3/335731; H02M 3/33584; H02M 1/42;
(Continued)

(56) References Cited

U.S. PATENT DOCUMENTS 5,231,563 A * 7/1993 Jitaru ................ H02M 3/33573
363/17
8,503,199 B1 * 8/2013 Chapuis .............. H02M 1/0085
363/21.06
(Continued)

FOREIGN PATENT DOCUMENTS

CN  101588135 A  11/2009
CN  101728961 3  6/2012
(Continued)

OTHER PUBLICATIONS

Carlos Henrique Illa Font et al., "A New High Power Factor Bidirectional Hybrid Three-Phase Rectifier," Applied Power Electronics Conference and Exposition, APEC '06, 21st Annual IEEE Mar. 19, 2006, 7 pages.

*Primary Examiner* — Gary L Laxton
(74) *Attorney, Agent, or Firm* — Slater Matsil, LLP (57) ABSTRACT

A bidirectional power conversion system includes an isolated power converter having a first input connected to an output of a diode rectifier and a second input connected to an output of a power factor correction device. The power conversion system further comprises a plurality of switches and a plurality of diodes configured such that the plurality of switches and the plurality of diodes form the diode rectifier and the power factor correction device when the system is configured to deliver power from an AC power source to a DC load and the plurality of switches forms an inverter when the system is configured to deliver power from a DC power source to an AC load.

16 Claims, 6 Drawing Sheets

(51) Int. Cl.
*H02M 1/42* (2007.01)
*H02M 7/797* (2006.01)
(52) U.S. Cl.
CPC ..... *H02M 1/4225* (2013.01); *H02M 3/33573* (2021.05); *H02M 3/33584* (2013.01)
(58) Field of Classification Search
CPC ............. H02M 1/4208; H02M 1/4225; H02M 1/0085; H02M 3/33573
See application file for complete search history.

(56) References Cited

U.S. PATENT DOCUMENTS

| | | | |
|---|---|---|---|
| 10,666,164 B2* | 5/2020 | Zhou | H02M 7/5387 |
| 2015/0078043 A1* | 3/2015 | Harkin | H02M 7/10 363/37 |
| 2016/0380531 A1 | 12/2016 | Kataoka et al. | |
| 2017/0229972 A1* | 8/2017 | Cerqueira Pinto Bezerra Varajão | H02M 7/797 |
| 2018/0219471 A1 | 8/2018 | Hirota et al. | |
| 2018/0222333 A1 | 8/2018 | Khaligh et al. | |

FOREIGN PATENT DOCUMENTS

| | | |
|---|---|---|
| CN | 102754320 A | 10/2012 |
| CN | 205051573 U | 2/2016 |
| JP | 2006271172 A | 10/2006 |
| JP | 2013247817 A | 12/2013 |

\* cited by examiner

//BIDIRECTIONAL POWER CONVERSION
SYSTEM AND CONTROL METHOD

CROSS-REFERENCE TO RELATED APPLICATIONS

This application is a continuation of Application No. PCT/US2019/039190, filed on Jun. 26, 2019, which application is hereby incorporated herein by reference in its entirety.

TECHNICAL FIELD

The present disclosure relates to a bidirectional power conversion system, and, in particular embodiments, to a bidirectional power conversion system connected between a single-phase alternating current (AC) power source and a direct current (DC) load such as a battery.

BACKGROUND

A power conversion system such as a telecommunication power system usually includes an AC/DC stage converting the power from the AC utility line to a 48 V DC distribution bus. A conventional AC/DC stage may comprise a variety of EMI filters, a bridge rectifier formed by four diodes, a power factor correction circuit and an isolated DC/DC power converter. The bridge rectifier converts an AC voltage into a full-wave rectified DC voltage. Such a full-wave rectified DC voltage provides a DC input voltage for the power factor correction circuit. The power factor correction circuit may be implemented by employing a power converter including a boost converter. By employing an appropriate control circuit, the boost converter is capable of shaping the input line current to be sinusoidal and in phase with the sinusoidal input voltage of the AC input source. As a result, the power factor of the AC/DC stage may be close to unity as required by a variety of international standards.

SUMMARY

These problems are generally solved or circumvented and the technical advantages are generally achieved by preferred embodiments of the present disclosure which provide a power conversion system and method for bidirectional power transferring between an AC power source and a battery.

In accordance with an embodiment, a system adapted to convert alternating current (AC) power into direct current (DC) power during a first system configuration and to convert DC power into AC power during a second system configuration, the system comprising a power conversion device including a first switching network and a second switching network magnetically coupled to each other, the first switching network configured to receive power from a diode rectifier and a power factor correction device when the system converts AC power into DC power, the second switching network configured as a first inverter and the first switching network configured as a rectifier when the system converts DC power into AC power, and a hybrid power device coupled to the power conversion device, wherein a portion of the hybrid power device is configured as the diode rectifier.

The power conversion device is a full-bridge inductor-inductor-capacitor (LLC) converter, wherein the hybrid power device includes a first leg comprising a first switch, a second switch connected in series with the first switch, a first diode connected in parallel with the first switch, and a second diode connected in parallel with the second switch, and a second leg comprising a third diode and a fourth diode connected in series, and wherein the power factor correction device includes a third switch, a fourth switch connected in series with the third switch, and an inductor connected to a common node of the third switch and the fourth switch.

The hybrid power device further includes a fifth diode and a sixth diode connected in series, the third diode being connected to a common node of the fifth diode and the sixth diode, wherein an anode of the fifth diode is connected to a common node of the first switch and the second switch, and a cathode of the fifth diode is connected to the first switch, and wherein the sixth diode, the second diode, the third diode and the fourth diode form the diode rectifier.

The power conversion system further comprises a first capacitor and a second capacitor connected in series, and a relay connected between a common node of the first capacitor and the second capacitor, and a common node of the sixth diode and the second diode. The relay is configured such that the diode rectifier, the first capacitor and the second capacitor form a voltage doubler.

Switches of the hybrid power device and switches of the power factor correction device are configured as a second inverter when the system is configured to convert DC power into AC power. An input voltage bus of the second inverter is directly connected to a second leg of the rectifier and indirectly connected to a first leg of the rectifier through the fifth diode.

The power conversion device is a full-bridge LLC converter comprising a first switching leg connected to an output of the diode rectifier and a second switching leg connected to an output of the power factor correction device. A resonant capacitor of the full-bridge LLC converter is configured to provide a DC bias voltage to balance a voltage difference between input voltages received by the full-bridge LLC converter.

In accordance with another embodiment, a method comprises transferring energy from an AC power source to a DC load through a power conversion device, wherein the energy is transferred from the AC power source to the power conversion device through a diode rectifier and a power factor correction device, and configuring the DC load as a DC power source and transferring energy from the DC power source to an AC load through the power conversion device, the diode rectifier and the power factor correction device.

The method further comprises during the step of transferring the energy from the AC power source to the DC load through the power conversion device, detecting an input voltage applied to the diode rectifier, activating a relay to configure the diode rectifier as a voltage doubler in a system operating condition where the input voltage is less than a predetermined voltage threshold, and disabling the relay after the input voltage applied to the diode rectifier is greater than the predetermined voltage threshold.

The power conversion device includes a first switching network and a second switching network magnetically coupled to each other, and wherein a hybrid power device includes a combination of switches and diodes, a portion of the hybrid power device is being configured as the diode rectifier.

The method further comprises during the step of configuring the DC load as the DC power source and transferring the energy from the DC power source to the AC load, configuring the second switching network as a first inverter, configuring the first switching network as a rectifier, and configuring switches of the hybrid power device and switches of the power factor correction device as a second inverter.

The method further comprises during the step of transferring the energy from the AC power source to the DC load through the power conversion device, configuring the second switching network as a secondary rectifier, and configuring the first switching network as a full-bridge switching network.

In accordance with yet another embodiment, a system adapted to deliver power from an AC power source to a DC load during a first system configuration and to deliver power from a DC power source to an AC load during a second system configuration, the system comprising an isolated power converter having a first input connected to an output of a diode rectifier and a second input connected to an output of a power factor correction device and a plurality of switches and a plurality of diodes configured such that the plurality of switches and the plurality of diodes form the diode rectifier and the power factor correction device when the system delivers power from the AC power source to the DC load, and the plurality of switches forms an inverter when the system is configured to deliver power from the DC power source to the AC load.

The plurality of switches and diodes includes a first switch and a second switch connected in series between a first voltage bus and a second voltage bus, a third switch and a fourth switch connected in series between the first voltage bus and the second voltage bus, a first diode and a second diode connected in parallel with the first switch and the second switch respectively, a third diode and a fourth diode connected in series between a third voltage bus and the second voltage bus, and a fifth diode and a sixth diode connected in series between the first voltage bus and the second voltage bus, and a common node of the fifth diode and the sixth diode being connected to the third voltage bus.

The second diode, the third diode, the fourth diode and the sixth diode are configured as the diode rectifier when the system is configured to deliver the power from the AC power source to the DC load, wherein the third switch and the fourth switch are configured as switches of the power factor correction device when the system is configured to deliver the power from the DC power source to the AC load, and wherein the first switch, the second switch, the third switch and the fourth switch are configured as the inverter when the system is configured to deliver the power from the DC power source to the AC load.

An advantage of an embodiment of the present disclosure is achieving a bidirectional high-efficiency power conversion system between an AC power source and a battery.

The foregoing has outlined rather broadly the features and technical advantages of the present disclosure in order that the detailed description of the disclosure that follows may be better understood. Additional features and advantages of the disclosure will be described hereinafter which form the subject of the claims of the disclosure. It should be appreciated by those skilled in the art that the conception and specific embodiment disclosed may be readily utilized as a basis for modifying or designing other structures or processes for carrying out the same purposes of the present disclosure. It should also be realized by those skilled in the art that such equivalent constructions do not depart from the spirit and scope of the disclosure as set forth in the appended claims.

BRIEF DESCRIPTION OF THE DRAWINGS

For a more complete understanding of the present disclosure, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the various embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present disclosure provides many applicable inventive concepts that can be embodied in a wide variety of specific contexts. The specific embodiments discussed are merely illustrative of specific ways to make and use the disclosure, and do not limit the scope of the disclosure.

The present disclosure will be described with respect to preferred embodiments in a specific context, namely a bidirectional power conversion system. The present disclosure may also be applied, however, to a variety of power conversion systems. Hereinafter, various embodiments will be explained in detail with reference to the accompanying drawings.

Figure 1:
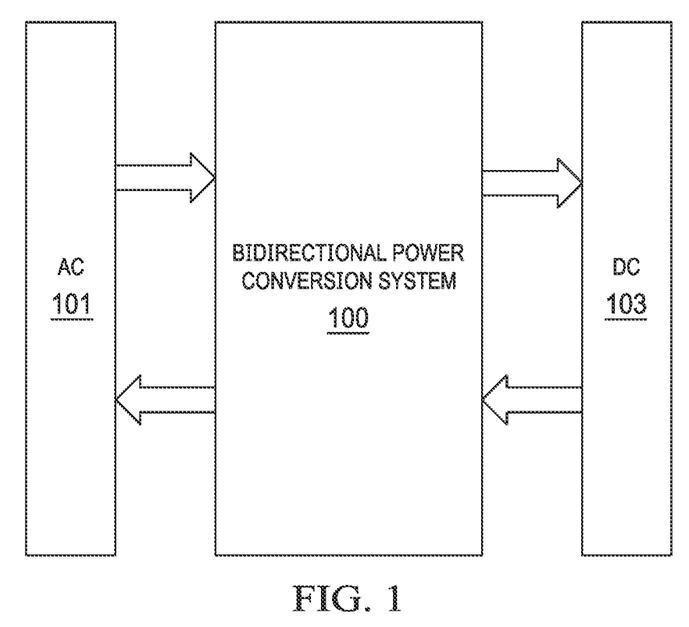
FIG. 1 illustrates a bidirectional power conversion system in accordance with various embodiments of the present disclosure.

FIG. 1 illustrates a bidirectional power conversion system in accordance with various embodiments of the present disclosure. The bidirectional power conversion system 100 is connected between an AC element 101 and a DC element 103. Depending on different applications and design needs, the AC element 101 can be implemented as either an AC power source or an AC load. Likewise, the DC element 103 can be implemented as either a DC load or a DC power source.

In some embodiments, when the bidirectional power conversion system 100 is configured to convert AC power into DC power, the AC element 101 is implemented as an AC power source from a utility grid. More particularly, the AC element 101 may be implemented as a single-phase AC power source. The DC element 103 may be a semiconductor chip, a battery, a downstream power converter and the like. In some embodiments, the DC element 103 may be a battery pack of an electric vehicle. The bidirectional power conversion system 100 shown in FIG. 1 may function as an electric vehicle charging converter.

In alternative embodiments, when the bidirectional power conversion system 100 is configured to convert DC power into AC power, the DC element 103 is implemented as a DC power source such as a battery. The AC element 101 is implemented as an AC load.

In some embodiments, when the bidirectional power conversion system 100 is configured to convert AC power into DC power, the bidirectional power conversion system 100 is configured to operate in a rectification mode. During the rectification mode, the bidirectional power conversion system 100 is capable of handling active power transfer. On the other hand, when the bidirectional power conversion system 100 is configured to convert DC power into AC power, the bidirectional power conversion system 100 is configured to operate in an inversion mode. During the inversion mode, the bidirectional power conversion system 100 is capable of handling reactive power transfer.

The bidirectional power conversion system 100 comprises an isolated power converter. In some embodiments, the isolated power converter is a full-bridge inductor-inductor-capacitor (LLC) converter comprising a first switching network and a second switching network magnetically coupled to the first switching network. The first switching network is the primary side of the full-bridge LLC converter. The first switching network comprises a first leg and a second leg. The first leg is connected to a first voltage bus, which is an output of a diode rectifier. The diode rectifier is employed to convert an AC voltage into a first input voltage on the first voltage bus. The second leg of the first switching network is connected to a second voltage bus, which is an output of a power factor correction device. The power factor correction device is employed to convert the AC voltage into a second input voltage on the second voltage bus. In some embodiments, the second input voltage is higher than the first input voltage. A resonant capacitor of the full-bridge LLC converter is employed to provide a bias voltage to offset the voltage difference between the first input voltage and the second input voltage.

The bidirectional power conversion system 100 further comprises a plurality of switches and a plurality of diodes placed between the AC power source and the isolated power converter. When the bidirectional power conversion system 100 is configured to convert AC power into DC power, the plurality of switches and the plurality of diodes are configured as the power factor correction device and the diode rectifier. The detailed operating principle of the power factor correction device and the diode rectifier will be described below with respect to FIG. 4. On the other hand, when the bidirectional power conversion system 100 is configured to convert DC power into AC power, the plurality of switches and the plurality of diodes are configured as an inverter and a conductive path between two different voltage buses. The detailed operating principle of the inverter and the conductive path will be described below with respect to FIG. 7.

The full-bridge LLC converter is a bidirectional power converter. When the bidirectional power conversion system 100 is configured to convert AC power into DC power, the first switching network of the full-bridge LLC converter is configured as the primary side of the full-bridge LLC converter. The second switching network of the full-bridge LLC converter is configured as a secondary rectifier. On the other hand, when the bidirectional power conversion system 100 is configured to convert DC power into AC power, the second switching network of the full-bridge LLC converter is configured as an inverter. The first switching network of the full-bridge LLC converter is configured as a rectifier.

In some embodiments, the full-bridge LLC converter is able to operate at a switching frequency substantially equal to the resonant frequency of the full-bridge LLC converter. As a result of having an LLC power converter operating at a switching frequency substantially equal to the resonant frequency, the bidirectional power conversion system 100 is a high efficiency power conversion system.

Furthermore, when the bidirectional power conversion system 100 is configured to convert AC power into DC power, the power factor correction device is configured such that the power factor of the bidirectional power conversion system 100 is adjusted to a level approximately equal to unity through adjusting the input current flowing into the power factor correction device.

In operation, in order to achieve high efficiency and a unity power factor, the power from the AC power source to the DC load is delivered through two routes, namely a first route comprising the diode rectifier and a second route comprising the power factor correction device. In some embodiments, the power flowing from the AC power source to the DC load through the power factor correction device is a fraction of the power from the AC power source to the DC load through the diode rectifier. For example, only about 10% of the power passes through the power factor correction device. The majority of the power (90%) passes through the diode rectifier. Such an uneven power distribution between two different power delivery routes helps to improve the efficiency of the bidirectional power conversion system 100.

Figure 2:
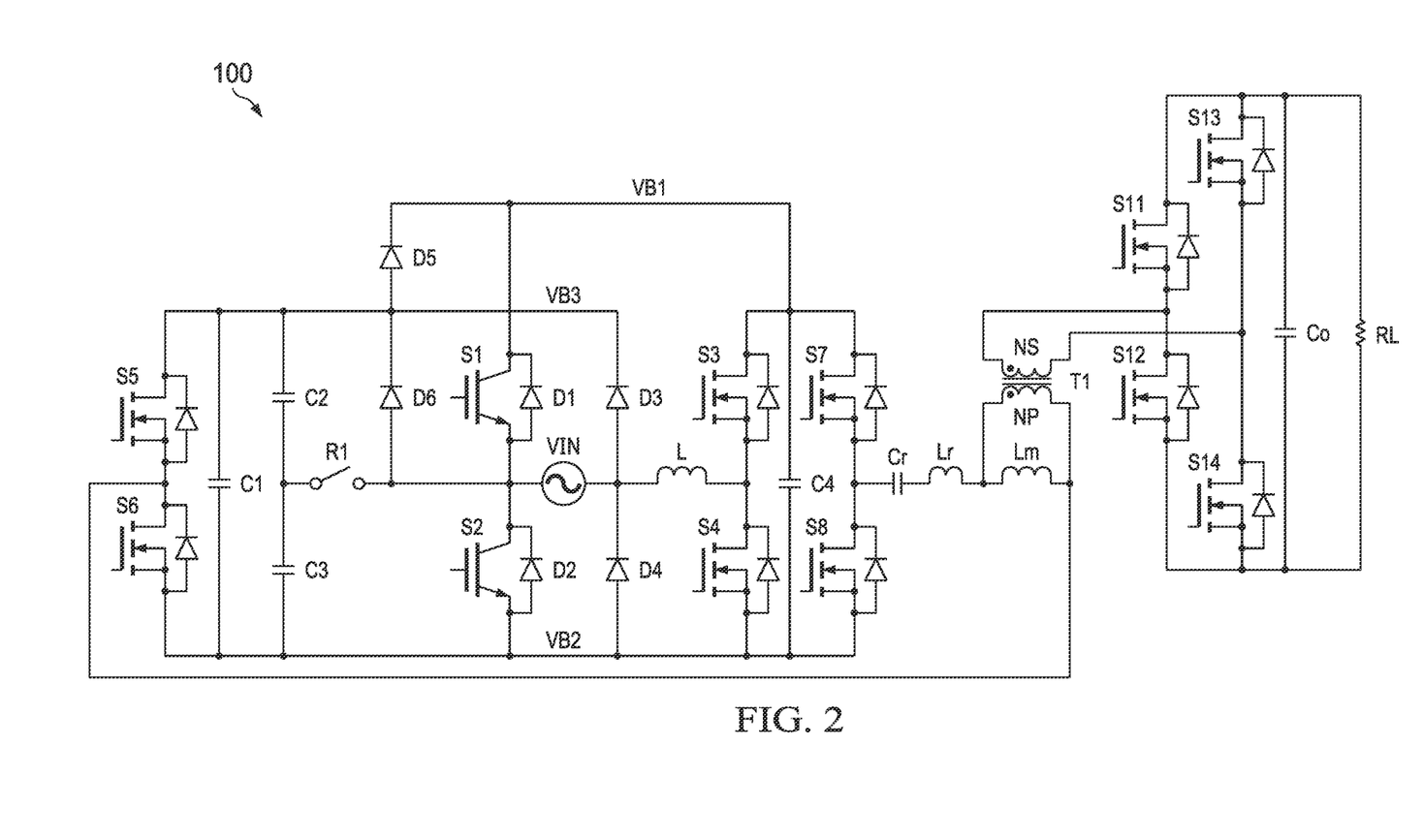
FIG. 2 illustrates a schematic diagram of the bidirectional power conversion system shown in FIG. 1 in accordance with various embodiments of the present disclosure.

FIG. 2 illustrates a schematic diagram of the bidirectional power conversion system shown in FIG. 1 in accordance with various embodiments of the present disclosure. The bidirectional power conversion system 100 comprises a full-bridge LLC converter and a plurality of switches and diodes connected between an AC power source VIN and the full-bridge LLC converter. The full-bridge LLC converter has two input voltages. A first input voltage is the voltage on a third voltage bus VB3, which is applied to a first leg of the full-bridge LLC converter. A second input voltage is the voltage on a first voltage bus VB1, which is applied to a second leg of the full-bridge LLC converter. As shown in FIG. 2, a first output capacitor C1 is connected between the third voltage bus VB3 and a second voltage bus VB2. A second output capacitor C2 and a third output capacitor C3 are connected in series between the third voltage bus VB3 and the second voltage bus VB2. A fourth output capacitor C4 is connected between the first voltage bus VB1 and the second voltage bus VB2.

The first capacitor C1, the second output capacitor C2 and the third output capacitor C3 are employed to smooth the voltage applied to the first leg of the full-bridge LLC converter. The fourth capacitor C4 is employed to smooth the voltage applied to the second leg of the full-bridge LLC converter.

The plurality of switches and diodes can be divided into two portions. A first portion is a hybrid power device comprising a first switch S1, a second switch S2, a first diode D1, a second diode D2, a third diode D3, a fourth diode D4, a fifth diode D5 and a sixth diode D6. A second portion of the plurality of switches and diodes comprises a third switch S3 and a fourth switch S4.

As shown in FIG. 2, the first switch S1 and the second switch S2 are connected in series between the first voltage bus VB1 and the second voltage bus VB2. The first diode D1 is connected in parallel with the first switch S1. The second diode D2 is connected in parallel with the second switch S2. The third diode D3 and the fourth diode D4 are connected in series between the third voltage bus VB3 and the second voltage bus VB2. The fifth diode D5 and the sixth diode D6 are connected in series between the first voltage bus VB1 and a common node of the first switch S1 and the second switch S2. The AC power source VIN is connected between a common node of switches S1, S2 and a common node of diodes D3 and D4.

In operation, the bidirectional power conversion system 100 may be configured to convert AC power into DC power. In other words, the bidirectional power conversion system 100 is configured as an AC/DC power conversion system. In the AC/DC power conversion system, diodes D6, D2, D3 and D4 form a diode rectifier converting an AC input waveform to a pulsating DC waveform. The capacitors C1, C2 and C3 are employed to reduce the ripple content of the pulsating DC waveform. The switches S3, S4 and an inductor L form a boost power converter. The boost power converter functions as a power factor correction device. As shown in FIG. 2, the output of the boost power converter is connected to the first voltage bus VB1. The output of the diode rectifier is connected to the third voltage bus VB3. In some embodiments, the voltage on the first voltage bus VB1 is higher the voltage on the third voltage bus VB3.

In operation, the bidirectional power conversion system 100 may be configured to convert DC power into AC power. In other words, the bidirectional power conversion system 100 is configured as a DC/AC power conversion system. In the DC/AC power conversion system, the switches S1, S2, S3 and S4 form an inverter. D1 and D2 are freewheeling diodes for S1 and S2 respectively. Diodes D3, D4 and D6 are revers-biased. Diode D6 provides a conductive path between the third voltage bus VB3 and the first voltage bus VB1.

As shown in FIG. 2, the full-bridge LLC power converter comprises a first switching network comprising switches S5-S8, a resonant tank comprising C4 and Lr, a transformer T1 and a second switching network comprising switches S11-S14. The output of the full-bridge LLC power converter is connected to a DC load RL. A capacitor Co is connected in parallel with the DC load RL. The capacitor Co is employed to reduce the ripple content of the output voltage of the full-bridge LLC power converter.

As shown in FIG. 2, the first switching network of the full-bridge LLC power converter comprises two legs. A first leg comprises switches S5 and S6 connected in series between the third voltage bus VB3 and the second voltage bus VB2. A second leg comprises switches S7 and S8 connected in series between the first voltage bus VB3 and the second voltage bus VB2. A first input terminal of a primary winding NP of a transformer T1 is connected to a common node of switches S7 and S8 through the resonant tank. A second input terminal of the primary winding NP of the transformer T1 is connected to a common node of switches S5 and S6.

In operation, when the bidirectional power conversion system 100 is configured as an AC/DC power conversion system, the full-bridge LLC power converter functions as an isolated power converter. The switching frequency of the plurality of switches of the full-bridge LLC power converter may be equal to the resonant frequency of the resonant tank. Alternatively, depending on design needs and different application, the switching frequency of the plurality of switches may vary in a narrow range to help the bidirectional power conversion system 100 regulate the output voltage.

In operation, when the bidirectional power conversion system 100 is configured as a DC/AC power conversion system, the second switching network functions as an inverter converting a DC voltage into an AC voltage. The AC voltage is fed into the first switching network through the transformer T1. The first switching network functions as a rectifier converting the AC voltage into DC voltages on the voltage buses VB1 and VB3.

According to some embodiments, switches S3-S8 and S11-S14 shown in FIG. 2 are implemented as MOSFET or MOSFETs connected in parallel, any combinations thereof and/or the like. According to alternative embodiments, S3-S8 and S11-S14 may be an insulated gate bipolar transistor (IGBT) device. Alternatively, the primary switches can be any controllable switches such as integrated gate commutated thyristor (IGCT) devices, gate turn-off thyristor (GTO) devices, silicon controlled rectifier (SCR) devices, junction gate field-effect transistor (JFET) devices, MOS controlled thyristor (MCT) devices, gallium nitride (GaN) based power devices and/or the like.

It should further be noted that while FIG. 2 illustrates switches S3-S8 and S11-S14 follow standard switch configurations, various embodiments of the present disclosure may include other variations, modifications and alternatives. For example, a separate capacitor may be connected in parallel with each switch. Such a separate capacitor helps to better control the timing of the resonant process of the LLC resonant converter.

In accordance with an embodiment, the switches S1 and S2 shown in FIG. 2 may be an IGBT device. Alternatively, the switching element can be any controllable switches such as MOSFET devices, IGCT devices, GTO devices, SCR devices, JFET devices, MCT devices and the like.

It should be noted that when the switches shown in FIG. 2 are implemented as MOSFET devices, the body diodes of switches can be used to provide a freewheeling channel. On the other hand, when the switches are implemented as IGBT devices, a separate freewheeling diode is required to be connected in parallel with its corresponding switch.

As shown in FIG. 2, diodes D1 and D2 are required to provide reverse conducting paths. In other words, diodes D1 and D2 are anti-parallel diodes. In some embodiments, diodes D1 and D2 are co-packaged with their respective IGBT devices. In alternative embodiments, didoes D1 and D2 are placed outside their respective IGBT devices.

It should further be noted that while FIG. 2 shows each bidirectional switch (e.g., switches S1 and S2) is formed by diodes and IGBT devices connected in an anti-parallel arrangement, one of ordinary skill in the art would recognize many variations, alternatives and modifications. For example, the bidirectional switch may be implemented by some new semiconductor switches such as anti-paralleled reverse blocking IGBTs arrangement. The discussion of the IGBT devices herein is applicable to other IGBT devices of this disclosure.

Figure 3:
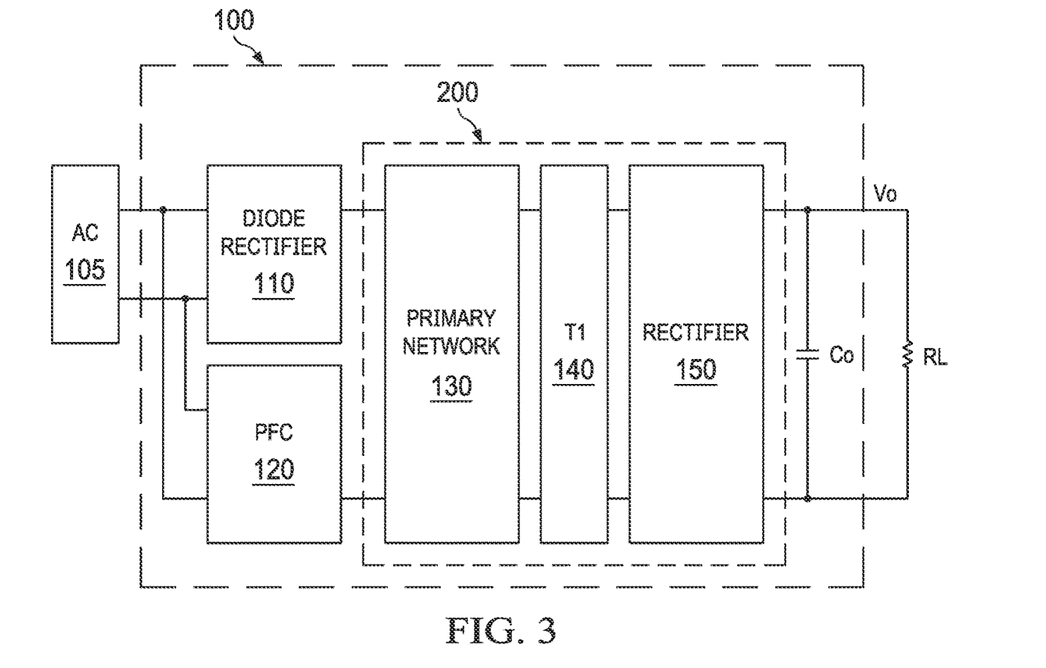
FIG. 3 illustrates a block diagram of the bidirectional power conversion system shown in FIG. 1 after the bidirectional power conversion system has been configured as an AC/DC power conversion system in accordance with various embodiments of the present disclosure.

FIG. 3 illustrates a block diagram of the bidirectional power conversion system shown in FIG. 1 after the bidirectional power conversion system has been configured as an AC/DC power conversion system in accordance with various embodiments of the present disclosure. The bidirectional power conversion system 100 comprises a diode rectifier 110, a power factor correction device 120 and an isolated power converter 200. As shown in FIG. 3, the power from an AC power source 105 is delivered to the isolated power converter 200 through the diode rectifier 110 and the power factor correction device 120 respectively. In other words, partial power goes through the diode rectifier 110. Partial power goes through the power factor correction device 120.

In some embodiments, the diode rectifier 110 is implemented as a line frequency diode bridge. The power factor correction device 120 is implemented as any suitable power factor correction converters such as a boost converter, active boost power factor correction rectifiers, Vienna rectifiers and the like. The detailed schematic diagrams of the diode rectifier 110 and the power factor correction device 120 will be described below with respect to FIG. 4.

In operation, the power from the AC power source 105 to the DC load RL is not evenly distributed between the diode rectifier 1100 and the power factor correction device 120. In some embodiments, the power flowing from the AC power source 105 to the DC load RL through the power factor correction device 120 is a fraction of the power from the AC power source 105 to the DC load RL through the diode rectifier 110. In some embodiments, the ratio of the power flowing through the diode rectifier 110 to the power flowing through the power factor correction device 120 is equal to 9:1. The input current of the power factor correction device 120 is adjusted so that the power factor of the bidirectional power conversion system 100 approaches unity (1).

One advantageous feature of the system configuration described above is the bidirectional power conversion system 100 is capable of achieving high efficiency as well as a unity power factor.

In some embodiments, the isolated power converter 200 is implemented as a full-bridge LLC power converter. Throughout the description, the isolated power converter 200 is alternatively referred to as a full-bridge LLC power converter. As shown in FIG. 3, the full-bridge LLC power converter 200 comprises a primary network 130, a transformer 140 and a rectifier 150 connected in cascade.

The primary network 130 comprises a plurality of switches and a resonant tank. In some embodiments, the switching frequency of the plurality of switches of the primary network 130 is equal to the resonant frequency of the resonant tank. Alternatively, depending on design needs and different application, the switching frequency of the plurality of switches may vary in a narrow range to help the full-bridge LLC power converter 200 regulate the output voltage of the bidirectional power conversion system 100. The detailed schematic diagram of the primary network 130 of the full-bridge LLC power converter 200 will be described below with respect to FIG. 4.

The transformer 140 provides electrical isolation between the primary side and the secondary side of the full-bridge LLC power converter 200. In accordance with an embodiment, the transformer 140 may be formed of two transformer windings, namely a primary transformer winding and a secondary transformer winding. Alternatively, the transformer 140 may have a center tapped secondary so as to have three transformer windings including a primary transformer winding, a first secondary transformer winding and a second secondary transformer winding. It should be noted that the transformers illustrated herein and throughout the description are merely examples, which should not unduly limit the scope of the claims. One of ordinary skill in the art would recognize many variations, alternatives and modifications. For example, the transformer 140 may further comprise a variety of bias windings and gate drive auxiliary windings.

The rectifier 150 converts an alternating polarity waveform received from the output of the transformer 140 to a single polarity waveform. The rectifier 150 may be formed of two pairs of switching elements such as MOSFETs. Alternatively, the rectifier 150 may be formed of two pairs of diodes.

It should be noted that the full-bridge LLC power converter is merely an example, which should not unduly limit the scope of the claims. One of ordinary skill in the art would recognize many variations, alternatives, and modifications The isolated power converter 200 can be implemented as any suitable isolated converters such as flyback converters, forward converters, push-pull converters, half-bridge converters, full-bridge converters, any combinations thereof and the like.

Figure 4:
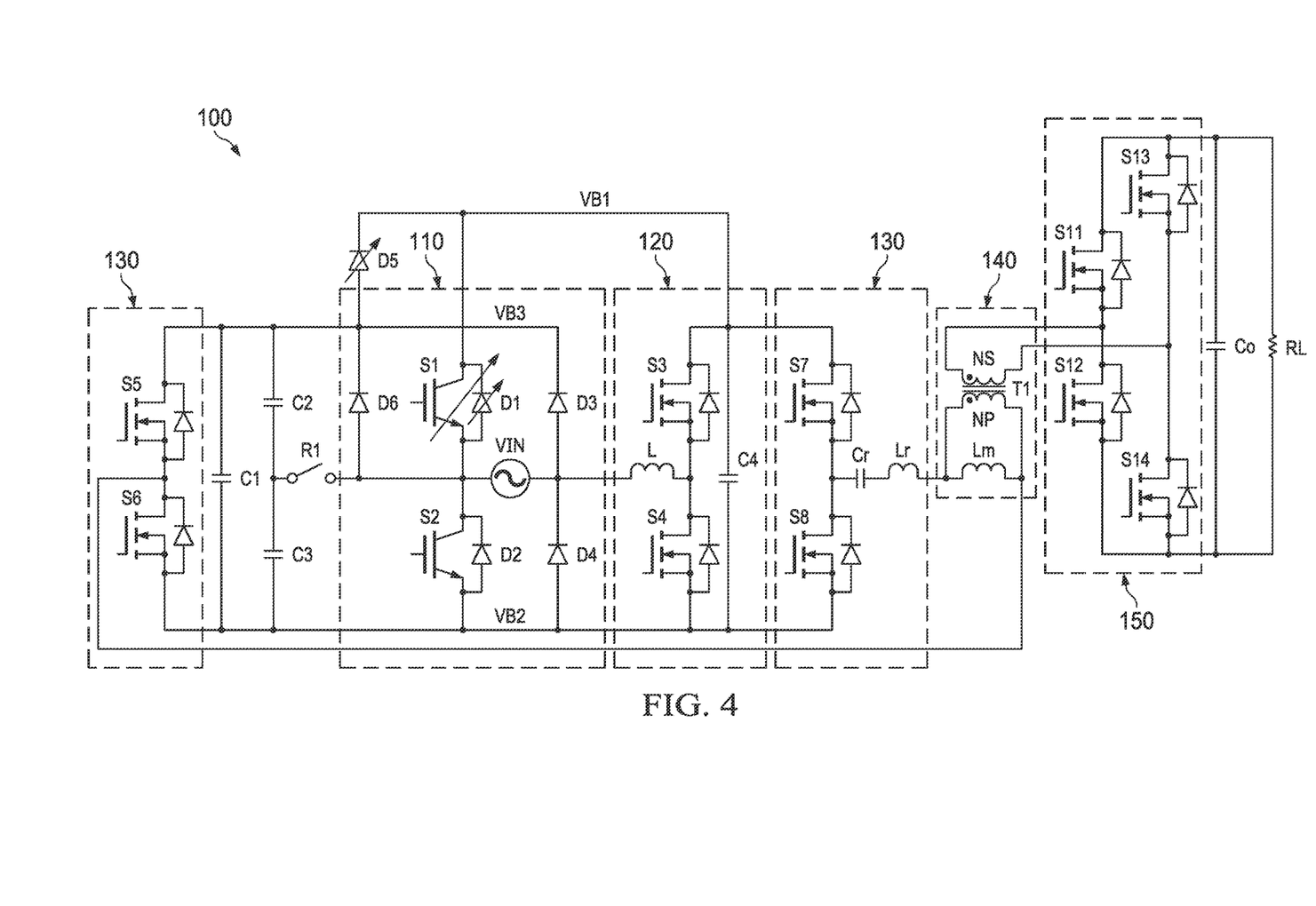
FIG. 4 illustrates a schematic diagram of a first implementation of the bidirectional power conversion system shown in FIG. 3 in accordance with various embodiments of the present disclosure.

FIG. 4 illustrates a schematic diagram of a first implementation of the bidirectional power conversion system shown in FIG. 3 in accordance with various embodiments of the present disclosure. After the bidirectional power conversion system 100 has been configured as an AC/DC power conversion system, switch S1 is turned off as indicated by the arrow placed on top of the symbol of S1. Likewise, the diodes D1 and D5 are reverse-biased as indicated by the arrows placed on the symbols of D1 and D5.

As shown in FIG. 4, the diode rectifier 110 comprises four diodes D6, D2, D3 and D4. The four diodes form two legs. A first leg comprises diodes D6 and D2 connected in series between the third voltage bus VB3 and the second voltage bus VB2. The common node of diodes D6 and D2 is connected to a first output terminal of the AC power source VIN. A second leg comprises diodes D3 and D4 connected in series between the third voltage bus VB3 and the second voltage bus VB2. The common node of diodes D3 and D4 is connected to a second output terminal of the AC power source VIN. The operating principle of the diode rectifier is well known, and hence is not discussed herein.

The power factor correction device 120 is implemented as a boost power factor correction converter. The boost power factor correction converter is connected to the AC power source VIN through switch S2. As shown in FIG. 4, the boost power factor correction converter comprises an inductor L, switch S3 and switch S4. The switch S3 and the switch S4 are connected in series between the first voltage bus VB1 and the second voltage bus VB2. The inductor L is connected between the second output terminal of the AC power source VIN and a common node of switches S3 and S4. The operating principle of the boost power factor correction converter is well known, and hence is not discussed herein. It should be noted that switch S2 provides a conductive path between the AC power source VIN and the boost power factor correction converter.

The primary network 130 includes four switches and a resonant tank. As shown in FIG. 4, a first pair of switches S5 and S6 are connected in series between the third voltage bus VB3 and the second voltage bus VB2. A second pair of switches S7 and S8 are connected in series between the first voltage bus VB1 and the second voltage bus VB2.

The common node of the switches S7 and S8 is coupled to a first input terminal of the primary winding NP of the transformer T1 through the resonant tank formed by Cr and Lr. Likewise, the common node of the switches S5 and S6 is coupled to a second input terminal of the primary winding NP of the transformer T1 directly.

It should be noted that while the example throughout the description is based upon a full bridge LLC resonant converter (e.g., full bridge LLC resonant converter shown in FIG. 4), the full-bridge LLC resonant converter shown in FIG. 4 may have many variations, alternatives and modifications. For example, half bridge converters, push-pull converters may be alternatively employed. The full bridge resonant converter illustrated herein is limited solely for the purpose of clearly illustrating the inventive aspects of the various embodiments. The present invention is not limited to any particular power topology.

FIG. 4 further illustrates the resonant tank is coupled between the full-bridge and the transformer T1. The resonant tank is formed by a series resonant inductor Lr, a series resonant capacitor Cr and a parallel inductance Lm. As shown in FIG. 4, the series resonant inductor Lr and the series resonant capacitor Cr are connected in series and further coupled to the primary side winding NP of the transformer T1.

It should be noted while FIG. 2 shows the series resonant inductor Lr is an independent component, the series resonant inductor Lr may be replaced by the leakage inductance of the transformer T1. In other words, the leakage inductance (not shown) may function as the series resonant inductor Lr.

The transformer T1 may be of a primary winding NP and a single secondary winding NS. The primary winding NP is coupled to the resonant tank as shown in FIG. 4. The secondary winding NS is coupled to the DC load RL through the rectifier 150, which is formed by switches S11, S12, S13 and S14.

It should be noted the transformer structure shown in FIG. 4 is merely an example. One person skilled in the art will recognize many alternatives, variations and modifications. For example, the secondary side of the transformer may be a center tapped winding. As a result, the secondary side may employ a synchronous rectifier formed by two switching elements. The operation principle of a synchronous rectifier coupled to a single secondary winding or a center tapped transformer secondary side is well known, and hence is not discussed in further detail herein.

Figure 5:
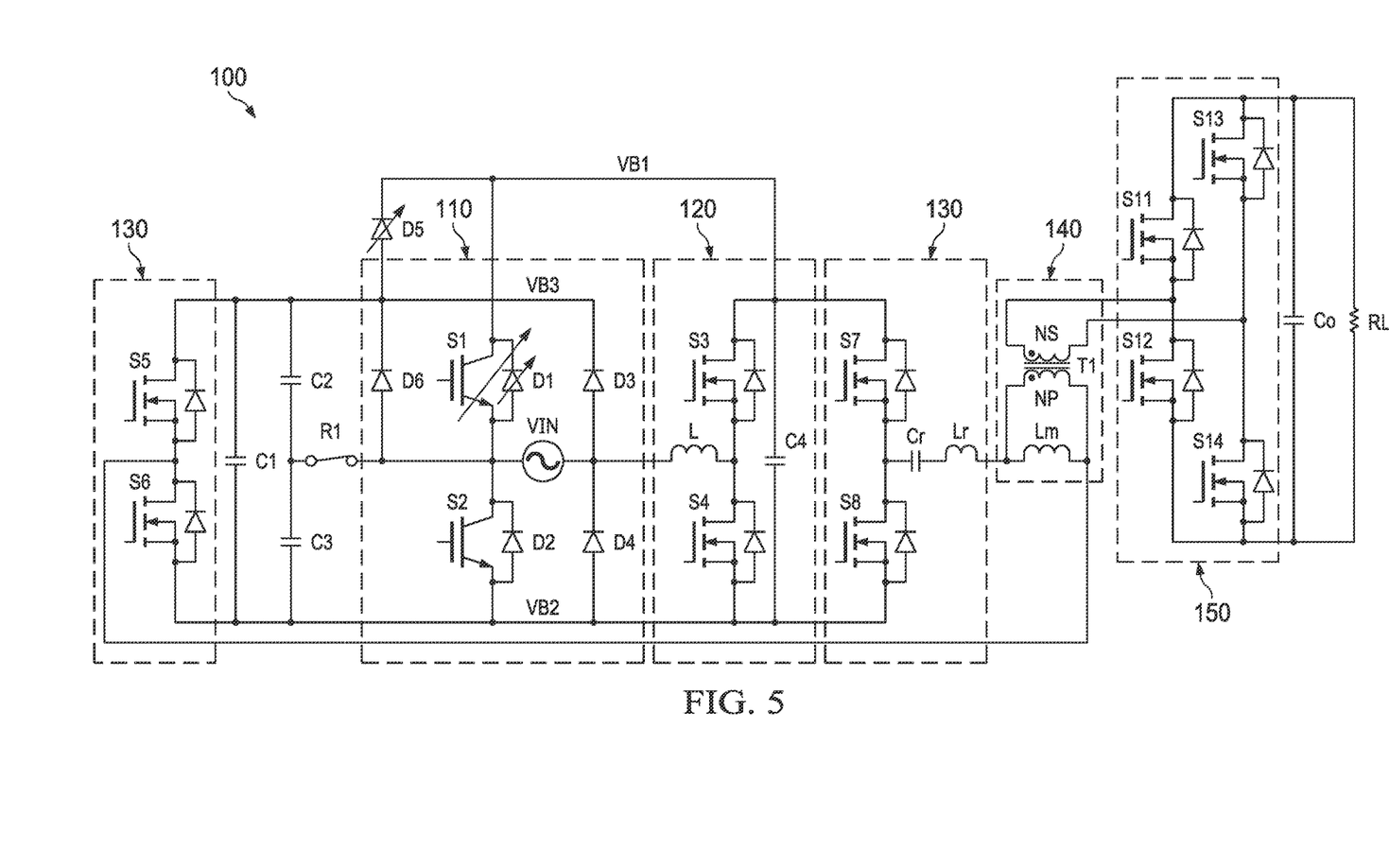
FIG. 5 illustrates a schematic diagram of a second implementation of the bidirectional power conversion system shown in FIG. 3 in accordance with various embodiments of the present disclosure.

FIG. 5 illustrates a schematic diagram of a second implementation of the bidirectional power conversion system shown in FIG. 3 in accordance with various embodiments of the present disclosure. The second implementation of the bidirectional power conversion system 100 shown in FIG. 5 is similar to that shown in FIG. 4 except that the relay R1 is closed in response to a different operating condition.

After the relay R1 is closed, diodes D3, D4, and capacitors C2, C3 form a voltage doubler. During a positive half cycle of the AC power source VIN, diode D3 conducts. As a result of the conduction of D3, the capacitor C2 is charged to a peak voltage of the AC power source VIN. The diode D4 is cut off during the positive half cycle. During a negative half cycle of the AC power source VIN, diode D4 conducts. As a result of the conduction of D4, the capacitor C3 is charged to the peak voltage of the AC power source VIN. The diode D3 is cut off during the negative half cycle. After having the voltage doubler shown in FIG. 5, the voltage between the third voltage bus VB3 and the second voltage bus VB2 is equal to two times the peak voltage of the AC power source VIN.

In operation, the relay R1 is activated or closed to configure the diode rectifier as a voltage doubler if the input voltage is less a predetermined voltage threshold. For example, when the AC power source VIN is from a 110 V AC system, the relay R1 is closed so as to achieve a higher voltage on the third voltage bus VB3. On the other hand, the relay R1 is disabled or open after the input voltage is greater than the predetermined voltage threshold. For example, when the AC power source VIN is from a 220 V AC system, the relay R1 is open so as to maintain the voltage on the third voltage bus VB3 within a suitable range.

It should be noted the output voltage of the power factor correction device 120 should be set to a voltage level higher than the output voltage of the voltage doubler. Otherwise, the diode D5 is not reverse-biased. Instead, there may be a short circuit between the first voltage bus VB1 and the third voltage bus VB3.

Figure 6:
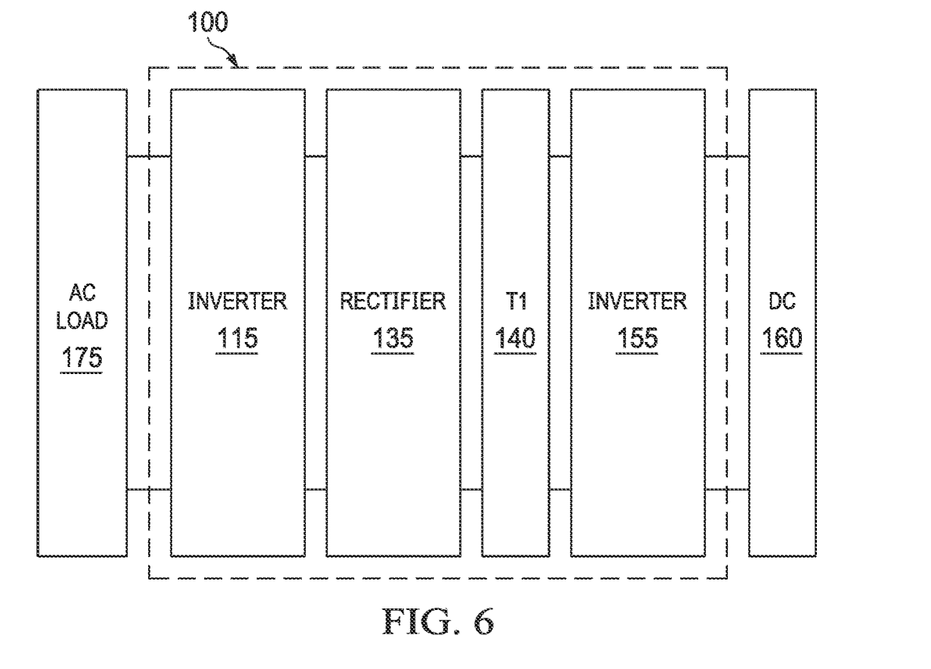
FIG. 6 illustrates a block diagram of the bidirectional power conversion system shown in FIG. 1 after the bidirectional power conversion system has been configured as a DC/AC power conversion system in accordance with various embodiments of the present disclosure.

FIG. 6 illustrates a block diagram of the bidirectional power conversion system shown in FIG. 1 after the bidirectional power conversion system has been configured as a DC/AC power conversion system in accordance with various embodiments of the present disclosure. The bidirectional power conversion system 100 is capable of converting a DC voltage into an AC voltage. As shown in FIG. 6, the bidirectional power conversion system 100 is connected between a DC power source 160 and an AC load 175. In some embodiments, the DC power source 160 may be a battery, an energy storage unit, a super capacitor, any combinations thereof and the like. The AC load 175 may be any suitable AC loads such as electrical machines and the like.

The bidirectional power conversion system 100 comprises a first inverter 155, a transformer 140, a rectifier 135 and a second inverter 115. The first inverter 155, the transformer 140, the rectifier 135 and the second inverter 115 are connected in cascade between the DC power source 160 and the AC load 175.

The first inverter 155 converts a single polarity waveform into an alternating polarity waveform. Through the transformer 140, the alternating polarity waveform is fed into the rectifier 135. The rectifier 135 converts the alternating polarity waveform received from the transformer 140 into a single polarity waveform. The second inverter 115 converts the single polarity waveform from the rectifier 135 into an alternating polarity waveform. The alternating polarity waveform is fed into the AC load.

Figure 7:
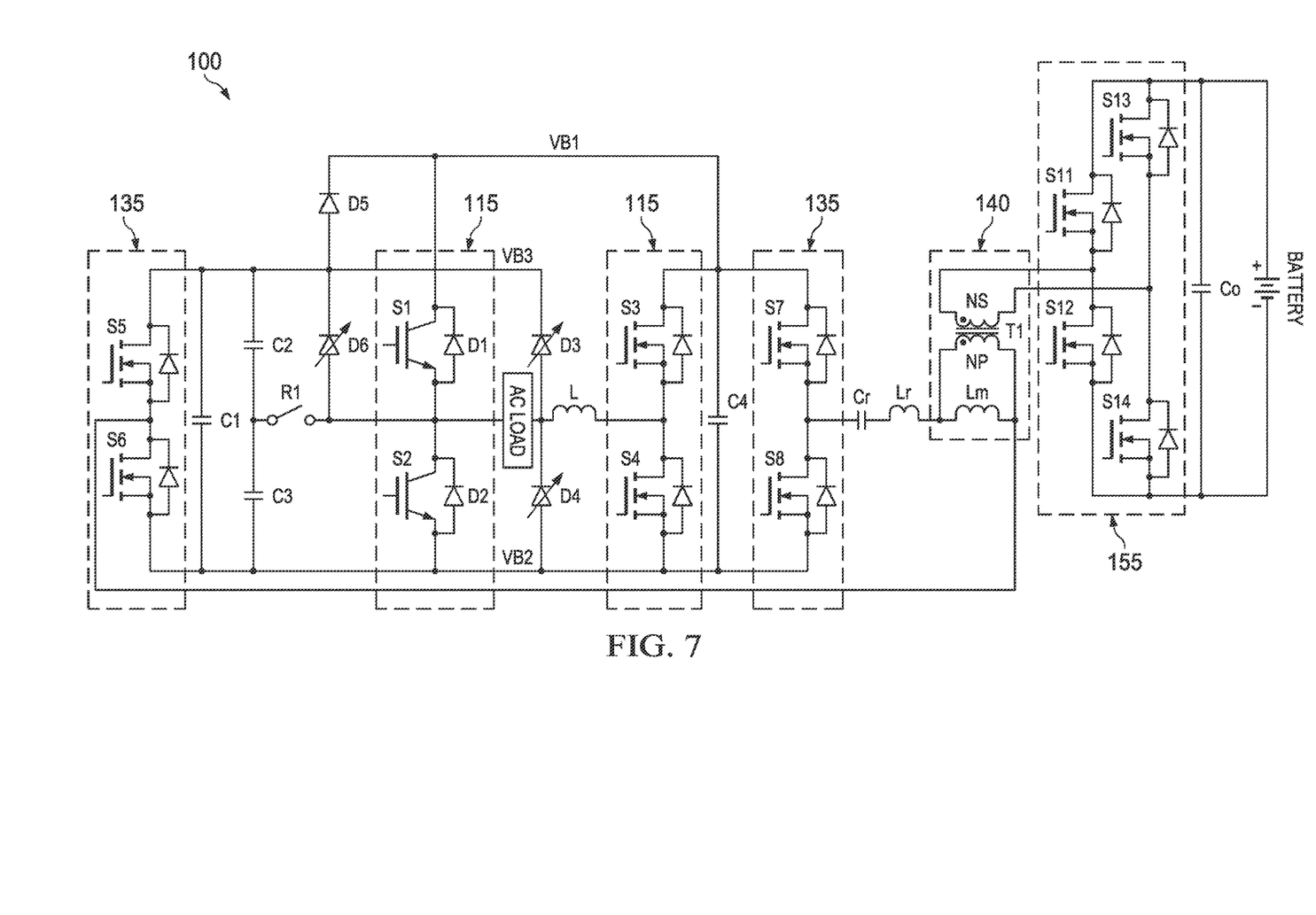
FIG. 7 illustrates a schematic diagram of the bidirectional power conversion system shown in FIG. 6 in accordance with various embodiments of the present disclosure.

FIG. 7 illustrates a schematic diagram of the bidirectional power conversion system shown in FIG. 6 in accordance with various embodiments of the present disclosure. After the bidirectional power conversion system 100 has been configured as a DC/AC power conversion system, the diodes D3, D4 and D5 are reverse-biased as indicated by the arrows placed on the symbols of D3, D4 and D5.

The first inverter 155 is based on the secondary rectifier 150 shown in FIG. 4. Configuring a rectifier to operate as an inverter is well known hence is not discussed herein. Likewise, the rectifier 135 is based on the full-bridge switching network shown in FIG. 4. Configuring a full-bridge switching network to operate as a rectifier is well known, and hence is not discussed herein. The outputs of the rectifier 135 establish two separate voltage buses (VB1 and VB3). The first voltage bus VB1 is connected to the input of the second inverter 115. The third voltage bus VB3 is connected to the input of the second inverter 115 through the diode D5.

The second inverter 115 is formed by switches S1, S2, S3, S4 and diodes D1, D2. Diodes D1 and D2 function as freewheeling diodes for switches S1 and S2 respectively. The second inverter 115 converts the DC voltage at the first voltage bus VB1 into an AC voltage, which is applied to the AC load. The operating principle of the inverter shown in FIG. 7 is well known, and hence is not discussed herein.

Figure 8:
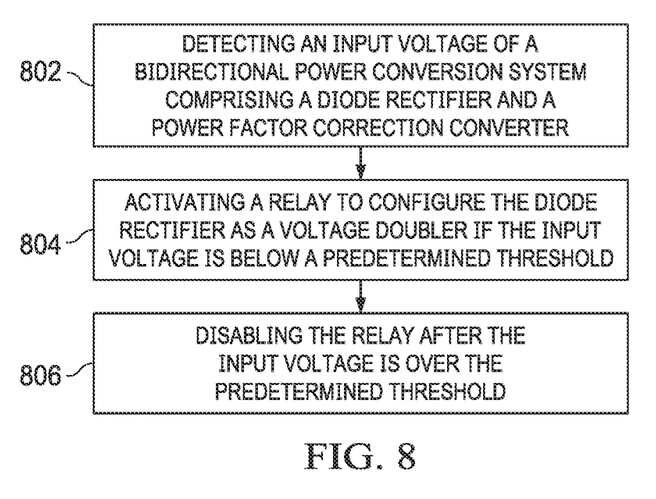
FIG. 8 illustrates a flow chart of a method for controlling the bidirectional power conversion system shown in FIG. 1 in accordance with various embodiments of the present disclosure.

FIG. 8 illustrates a flow chart of a method for controlling the bidirectional power conversion system shown in FIG. 1 in accordance with various embodiments of the present disclosure. This flowchart shown in FIG. 8 is merely an example, which should not unduly limit the scope of the claims. One of ordinary skill in the art would recognize many variations, alternatives, and modifications. For example, various steps illustrated in FIG. 8 may be added, removed, replaced, rearranged and repeated.

A bidirectional power conversion system comprises a diode rectifier, a power factor correction device and an isolated power converter. When the bidirectional power conversion system is configured as an AC/DC power conversion system, the power from the AC power source is delivered to the isolated power converter through two routes. In other words, the power goes partially through the diode rectifier and partially through the power factor correction device.

The bidirectional power conversion system further comprises a relay. By controlling the on/off of the relay, the diode rectifier and two input capacitors may be configured as a voltage doubler.

The bidirectional power conversion system can also be configured as a DC/AC power conversion system. In the DC/AC power conversion system, the isolated power converter, the diode rectifier and the power factor correction device of the bidirectional power conversion system are configured as a first inverter, a rectifier and a second inverter connected in cascade between a DC power source and an AC load.

At step 802, a suitable voltage sensor detects an input voltage of a bidirectional power conversion system. In some embodiments, the input voltage is from an AC power source. The AC power source may be from a 110 V AC system. Alternatively, the AC power source may be from a 220 V AC system.

At step 804, a relay is activated when the input voltage is less than a predetermined voltage threshold. After the relay is activated, the diode rectifier of the bidirectional power conversion system and two capacitors are configured as a voltage doubler. Such a voltage doubler helps to increase the bus voltage when the bidirectional power conversion system is connected to a low AC line such as 110 V.

At step 806, the relay is disabled or open after the input voltage is greater than the predetermined voltage threshold. After the relay is open, the bus voltage is generated from the diode rectifier. The bidirectional power conversion system having an open relay is suitable for applications having a high AC line such as 220 V.

Although embodiments of the present disclosure and its advantages have been described in detail, it should be understood that various changes, substitutions and alterations can be made herein without departing from the spirit and scope of the disclosure as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps. The specification and drawings are, accordingly, to be regarded simply as an illustration of the disclosure as defined by the appended claims, and are contemplated to cover any and all modifications, variations, combinations or equivalents that fall within the scope of the present disclosure.

What is claimed is:

1. A system adapted to convert alternating current (AC) power into direct current (DC) power during a first system configuration and to convert DC power into AC power during a second system configuration, the system comprising:
a power conversion device including a first switching network and a second switching network magnetically coupled to each other, the first switching network configured to receive power from a diode rectifier and a power factor correction device when the system converts AC power into DC power, the second switching network configured as a first inverter and the first switching network configured as a rectifier when the system converts DC power into AC power, wherein the power factor correction device includes a third switch, a fourth switch connected in series with the third switch, and an inductor connected to a common node of the third switch and the fourth switch,
wherein the power conversion device is a full-bridge LLC converter comprising a first switching leg connected to an output of the diode rectifier and a second switching leg connected to an output of the power factor correction device; and
a hybrid power device coupled to the power conversion device, wherein a portion of the hybrid power device is configured as the diode rectifier.

2. The system of claim 1, wherein the power conversion device is a full-bridge inductor-inductor-capacitor (LLC) converter, and wherein the hybrid power device includes a first leg comprising a first switch, a second switch connected in series with the first switch, a first diode connected in parallel with the first switch, and a second diode connected in parallel with the second switch, and a second leg comprising a third diode and a fourth diode connected in series.

3. The system of claim 2, wherein the hybrid power device further includes a fifth diode and a sixth diode connected in series, the third diode being connected to a common node of the fifth diode and the sixth diode, wherein an anode of the fifth diode is connected to a common node of the first switch and the second switch, and a cathode of the fifth diode is connected to the first switch, and wherein the sixth diode, the second diode, the third diode and the fourth diode form the diode rectifier.

4. The system of claim 3, further comprising:
a first capacitor and a second capacitor connected in series; and
a relay connected between a common node of the first capacitor and the second capacitor, and a common node of the sixth diode and the second diode.

5. The system of claim 4, wherein the relay is configured such that the diode rectifier, the first capacitor, and the second capacitor form a voltage doubler.

6. The system of claim 4, wherein switches of the hybrid power device and switches of the power factor correction device are configured as a second inverter when the system is configured to convert DC power into AC power.

7. The system of claim 6, wherein an input voltage bus of the second inverter is directly connected to a second leg of the rectifier and indirectly connected to a first leg of the rectifier through the fifth diode.

8. The system of claim 1, wherein a resonant capacitor of the full-bridge LLC converter is configured to provide a DC bias voltage to balance a voltage difference between input voltages received by the full-bridge LLC converter.

9. The system of claim 1, wherein switches of the hybrid power device are insulated-gate bipolar transistors (IGBTs), and switches of the first switching network and the second switching network are metal-oxide semiconductor field-effect transistors (MOSFETs).

10. The system of claim 1, wherein when the system converts AC power into DC power, AC power is applied to the power conversion device through the diode rectifier and the power factor correction device, an output voltage of the power factor correction device being higher than an output voltage of the diode rectifier.

11. A method comprising:
   transferring energy from an AC power source to a DC load through a power conversion device, wherein the energy is transferred from the AC power source to the power conversion device through a diode rectifier and a power factor correction device, wherein the diode rectifier and the power factor correction device are external to each other, and wherein the power conversion device includes a first switching network and a second switching network magnetically coupled to each other, and wherein a hybrid power device includes a combination of switches and diodes, a portion of the hybrid power device being configured as the diode rectifier;
   configuring the DC load as a DC power source and transferring energy from the DC power source to an AC load through the power conversion device, the diode rectifier and the power factor correction device;
   during the configuring the DC load as the DC power source and the transferring the energy from the DC power source to the AC load, configuring the second switching network as a first inverter;
   configuring the first switching network as a rectifier; and
   configuring switches of the hybrid power device and switches of the power factor correction device as a second inverter.

12. The method of claim 11, further comprising:
   during the transferring the energy from the AC power source to the DC load through the power conversion device, detecting an input voltage applied to the diode rectifier;
   activating a relay to configure the diode rectifier as a voltage doubler in a system operating condition where the input voltage is less than a predetermined voltage threshold; and
   disabling the relay after the input voltage applied to the diode rectifier is greater than the predetermined voltage threshold.

13. The method of claim 11, further comprising:
   during the transferring the energy from the AC power source to the DC load through the power conversion device, configuring the second switching network as a secondary rectifier; and
   configuring the first switching network as a full-bridge switching network.

14. A system adapted to deliver power from an AC power source to a DC load during a first system configuration and to deliver power from a DC power source to an AC load during a second system configuration, the system comprising:
   an isolated power converter having a first input connected to an output of a diode rectifier and a second input connected to an output of a power factor correction device, wherein the diode rectifier and the power factor correction device are external to each other; and
   a plurality of switches and a plurality of diodes configured such that:
      the plurality of switches and the plurality of diodes form the diode rectifier and the power factor correction device when the system delivers power from the AC power source to the DC load; and
      the plurality of switches forms an inverter when the system is configured to deliver power from the DC power source to the AC load,
   wherein the plurality of switches and diodes includes a first switch and a second switch connected in series between a first voltage bus and a second voltage bus, a third switch and a fourth switch connected in series between the first voltage bus and the second voltage bus, a first diode and a second diode connected in parallel with the first switch and the second switch respectively, a third diode and a fourth diode connected in series between a third voltage bus and the second voltage bus, and a fifth diode and a sixth diode connected in series between the first voltage bus and the second voltage bus, and a common node of the fifth diode and the sixth diode being connected to the third voltage bus.

15. The system of claim 14, wherein the isolated power converter is an inductor-inductor-capacitor (LLC) power converter.

16. The system of claim 14, wherein the second diode, the third diode, the fourth diode and the sixth diode are configured as the diode rectifier when the system is configured to deliver the power from the AC power source to the DC load, wherein the third switch and the fourth switch are configured as switches of the power factor correction device when the system is configured to deliver the power from the DC power source to the AC load, and wherein the first switch, the second switch, the third switch and the fourth switch are configured as the inverter when the system is configured to deliver the power from the DC power source to the AC load.

* * * * *